7342X
D. Flagg,
Horse Power.
Patented Dec, 28, 1832.
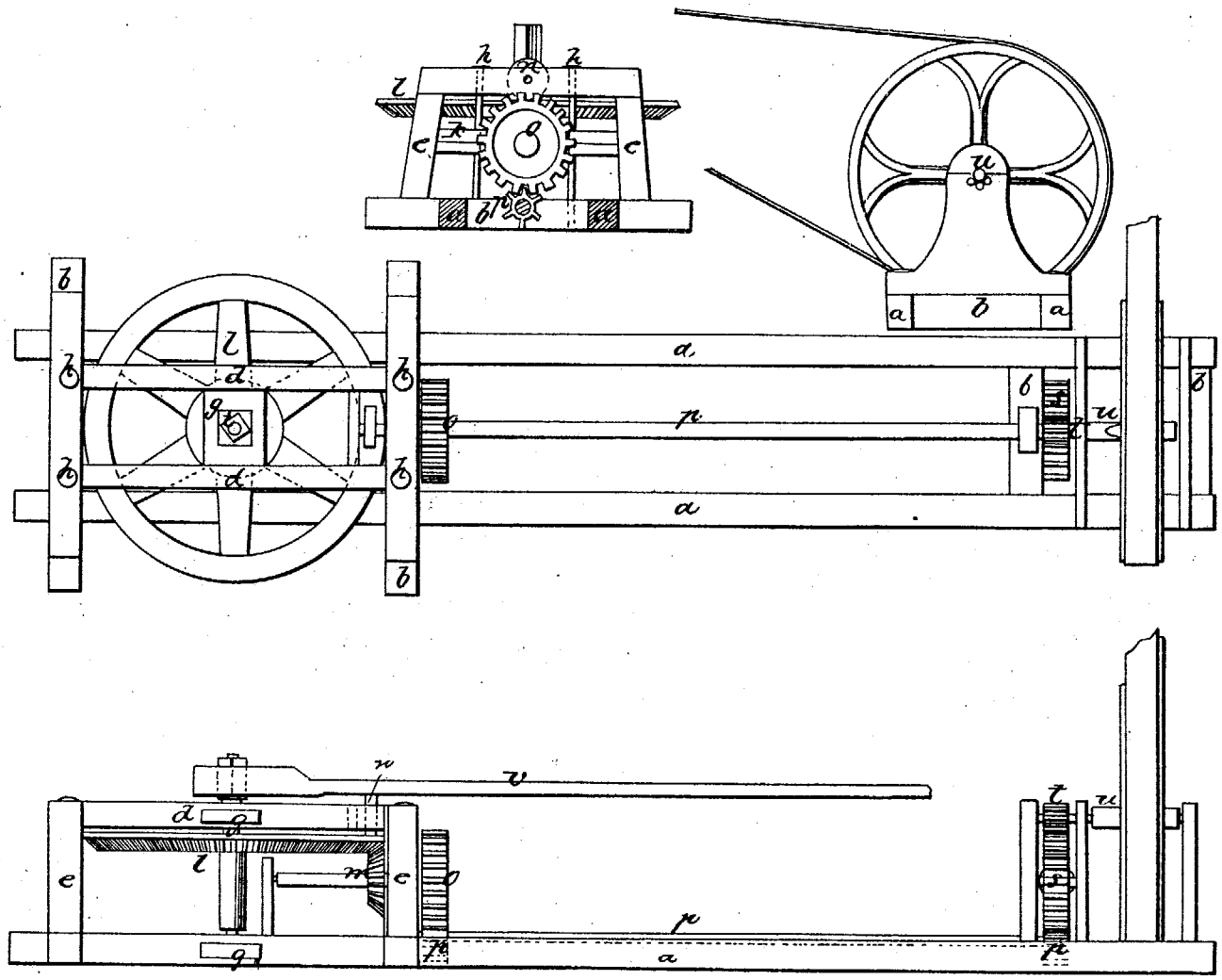
AM. PHOTO-LITHO. CO. N.Y. (OSBORNE'S PROCESS)

Dec. 28. 1832

7342x David Flagg Jun.

Letters Patent.

The schedule referred to in these Letters Patent, and making part of the same, containing a description in the words of the said David Flagg Jun. himself of his improvement in the machine for propelling machinery called "Flagg's Portable Horse Power."

Be it known that I David Flagg Jun. of New York, in the County of New York, and State of New York, have made an improvement in the machine for propelling machinery called "Flagg's Portable Horse Power" which is described as follows. Take two sills of a suitable size and length, say fourteen feet long, more or less, lock them to four cross sills, eighteen inches apart, and bolt them together. These cross sills are at each end of the long sills, and at a suitable distance from each other to receive the wheels and pinions, which give motion to the machine, on one end of the sills is a frame which contains the main wheel and pinion. This frame is made by framing four posts into the cross sills outside of the long sills leaning towards each other at the top ends. On the top of these posts are cross pieces similar to the cross sills, which are framed on the tops of the posts about fifteen inches above the sills. On the tops of these cross pieces are two plates locked on them at right angles, reaching from one to the other, being fastened to them by bolts passing through into the short sills at the bottom; in these plates are mortises, into which is framed the head block, through which the shaft of the main wheel passes to receive the lever to which the power is applied, to give motion to the machine. There are also two girts framed into the said posts, at a suitable distance from the sills to receive the box and journal of the main pinion, which gears with the main wheel, the other end of the shaft or journal being supported by a piece of plank of suitable width and thickness to receive it.

The

Drawing made.

78 7342x Dec 28, 1832

All the journals run on friction wheels of the following descrip-
tion, they are cast iron three inches in diameter - one and a
quarter inch thick more or less, and run on a pin passing
through them loosely so as to admit of their turning on them,
the journals which rest on them are kept in their places by
means of a cap placed over them & bolted to the frame. The main
wheel which turns horizontally, may be varied in size ac-
cording to the dimensions of the Machine, it is on the bevel gear
principle, and should drive the pinion five revolutions to one of its
own. it is placed on an upright shaft which is supported within
the frame by a cross piece, running from one sill to the other and
locked thereon. On the shaft of the main pinion is a cog
wheel fourteen or fifteen inches diameter more or less. this
wheel gears with the pinion on the line shaft, which shaft extends
to the opposite end of the Machine to the object to be propelled, and
is supported by the cross sills. on the end next to the machine to
be propelled is a cog wheel of the same size as the one on the shaft
of the main pinion, which gears with a pinion on the shaft of
the band wheel. The band wheel is supported by two pieces of plank
bolted to the sills edgewise of suitable width to receive the journals
of the same, this band wheel should be of such size as to give the
speed required to the cylinders of a thrashing machine, they being connected
together by bands. A friction roller or travelling wheel, supported by a
suitable standard is placed on the top of the main wheel to keep it in
gear with the pinion, for a further illustration of my invention
I refer to the model and drawing of the same deposited in the Patent
Office. What I claim as my invention and wish to secure by Letters
Patent is the peculiar arrangement of the several parts of the [illegible]
before described portable horse power for propelling machinery
Done at the City of Washington this 15th day of December 1832

Witnesses
Exd. William P. Elliot
WPE Saml. P. Walker

David Flagg [illegible]

(Dec 28, 1832) (705 words)